(12) United States Patent
Love et al.

(10) Patent No.: US 8,641,363 B2
(45) Date of Patent: Feb. 4, 2014

(54) TURBOCHARGER WITH INTEGRATED ACTUATOR

(75) Inventors: Andrew C. Love, Lorraine (FR); Nicolas Devulder, Tokyo (JP)

(73) Assignee: Honeywell International Inc., Morristown, NJ (US)

( * ) Notice: Subject to any disclaimer, the term of this patent is extended or adjusted under 35 U.S.C. 154(b) by 599 days.

(21) Appl. No.: 12/930,238

(22) Filed: Dec. 29, 2010

(65) Prior Publication Data
US 2012/0171059 A1 Jul. 5, 2012

(51) Int. Cl.
*F04D 27/00* (2006.01)

(52) U.S. Cl.
USPC .............. 415/17; 415/29; 415/49; 415/126; 415/145; 415/147; 415/158; 415/205

(58) Field of Classification Search
USPC ............ 415/17, 29, 49, 126, 145, 147, 149.3, 415/157, 158, 205
See application file for complete search history.

(56) References Cited

U.S. PATENT DOCUMENTS 2,336,010 A * 12/1943 Gregory et al. ............... 415/159
2,861,774 A * 11/1958 Buchi .............................. 415/17
2,874,642 A * 2/1959 Forrest ......................... 415/52.1
4,643,639 A * 2/1987 Caine ............................ 415/148
6,139,262 A * 10/2000 Ravidranath .................. 415/150

FOREIGN PATENT DOCUMENTS

GB 2033007 A 5/1980

* cited by examiner

*Primary Examiner* — Igor Kershteyn
(74) *Attorney, Agent, or Firm* — The Law Office of John A. Griecci

(57) ABSTRACT

A turbocharger having a turbine with a wastegate, and a compressor including a compressor housing, a compressor wheel, and a wastegate actuator. The turbine wheel includes blades defining an inlet. The compressor housing has an inlet wall leading to the inlet, and a shroud wall surrounding the blades. The actuator includes a base that is integral with the inlet wall, and an electric motor that is attached to the base. The shroud wall forms a first port that is in direct fluid communication with the actuator chamber, and the inlet wall forms a second port that is in direct fluid communication with the actuator chamber. Air from the first port to passes through the actuator housing and out the second port. This airflow convectively cools the working components of the actuator, while the connection of the motor to the inlet wall conductively cools the motor.

15 Claims, 5 Drawing Sheets

TURBOCHARGER WITH INTEGRATED ACTUATOR

The present invention relates generally to a turbocharger and, more particularly, to a turbocharger having an integral, air cooled, electric wastegate actuator.

BACKGROUND OF THE INVENTION

Stricter emission requirements and increased performance requirements for internal combustion engine turbochargers continue to drive technological advancements in turbocharger design. One area of potential improvement is in wastegate design. Wastegate actuation system designs that provide for faster or stronger actuation allow for more accurate control of a wastegate, and thus more efficient turbocharger operation. Wastegate actuation system designs that provide for an improved actuation strength (for a given actuator size or weight), allow for smaller and lighter actuators to be used, as well as potentially offering for more accurate operation in extreme operating conditions.

Actuation systems using an electric actuator (e.g., a DC motor) can provide for fast and powerful actuation, but electric actuators have a number of drawbacks. Among those drawbacks are a larger package size and a lower maximum operating temperature than a comparable pneumatic system. For example, a typical electric actuator operating temperature is limited to 160 degrees centigrade, whereas a typical pneumatic actuator has a continuous operating temperature of up to 180 degrees centigrade. Moreover, at its maximum operating temperature, a DC motor has to be de-rated, i.e., the motor duty must be reduced (e.g., by 50%) to avoid the stator windings from exceeding their rated limit.

Accordingly, there has existed a need for a fast, powerful and compact wastegate actuation system that can operate effectively in the hot environment of a turbocharger without having to be de-rated. Preferred embodiments of the present invention satisfy these and other needs, and provide further related advantages.

SUMMARY OF THE INVENTION

In various embodiments, the present invention solves some or all of the needs mentioned above, typically providing a fast, powerful and compact wastegate actuation system that can operate effectively in the hot environment of a turbocharger without having to be de-rated.

In typical embodiments, the invention is a turbocharger having a turbine with a wastegate, and a compressor that includes a compressor housing, a compressor wheel, and an actuator for the turbine wastegate. The turbine wheel is rotatably mounted within the compressor housing, and includes a hub and a plurality of blades. Each blade extends out from the hub and defines a leading edge and an outer edge. The blade leading edges in rotation establish a compressor inlet. The compressor housing forms an inlet wall defining an inlet passageway leading to the compressor inlet, and a shroud wall closely conforming to the blade outer edges.

The actuator includes an actuation mechanism such as an electric motor, and an actuator housing that forms an actuator chamber. Advantageously, the shroud wall forms a first port that is in direct fluid communication with the actuator chamber, and the inlet wall forms a second port that is in direct fluid communication with the actuator chamber. This combination of ports provides for partially pressurized air to be injected into the actuator chamber through the first port, across a thermally significant portion of the actuation mechanism, and back out the second port and into the inlet. The airflow convectively cools the working components of the actuator, allowing the actuator (and particularly an electric motor) to operate at its full duty cycle through all or most operating conditions.

In another feature of the invention, the actuator housing contains an electric motor, and the electric motor is thermally coupled to a motor-surface of the portion of the compressor housing that forms the inlet wall. The electric motor is thermally coupled to the inlet wall using a mechanically resilient thermocouple material providing significant vibration damping between the motor and the motor-surface. Advantageously, the inlet wall thermal connection allows the inlet wall to act as a heat sink and provide conductive cooling to the motor, allowing the motor to operate at its full duty cycle through all or most operating conditions, while the damped structural connection between the inlet wall and the motor reduces structural strain on the bearings of the motor, increasing reliability.

Other features and advantages of the invention will become apparent from the following detailed description of the preferred embodiments, taken with the accompanying drawings, which illustrate, by way of example, the principles of the invention. The detailed description of particular preferred embodiments, as set out below to enable one to build and use an embodiment of the invention, are not intended to limit the enumerated claims, but rather, they are intended to serve as particular examples of the claimed invention.

DETAILED DESCRIPTION OF THE PREFERRED EMBODIMENTS

The invention summarized above and defined by the enumerated claims may be better understood by referring to the following detailed description, which should be read with the accompanying drawings. This detailed description of particular preferred embodiments of the invention, set out below to enable one to build and use particular implementations of the invention, is not intended to limit the enumerated claims, but rather, it is intended to provide particular examples of them.

Typical embodiments of the present invention reside in a fast, powerful and compact wastegate actuation system that can operate effectively in the hot environment of a turbocharger without having to be de-rated.

Figure 1:
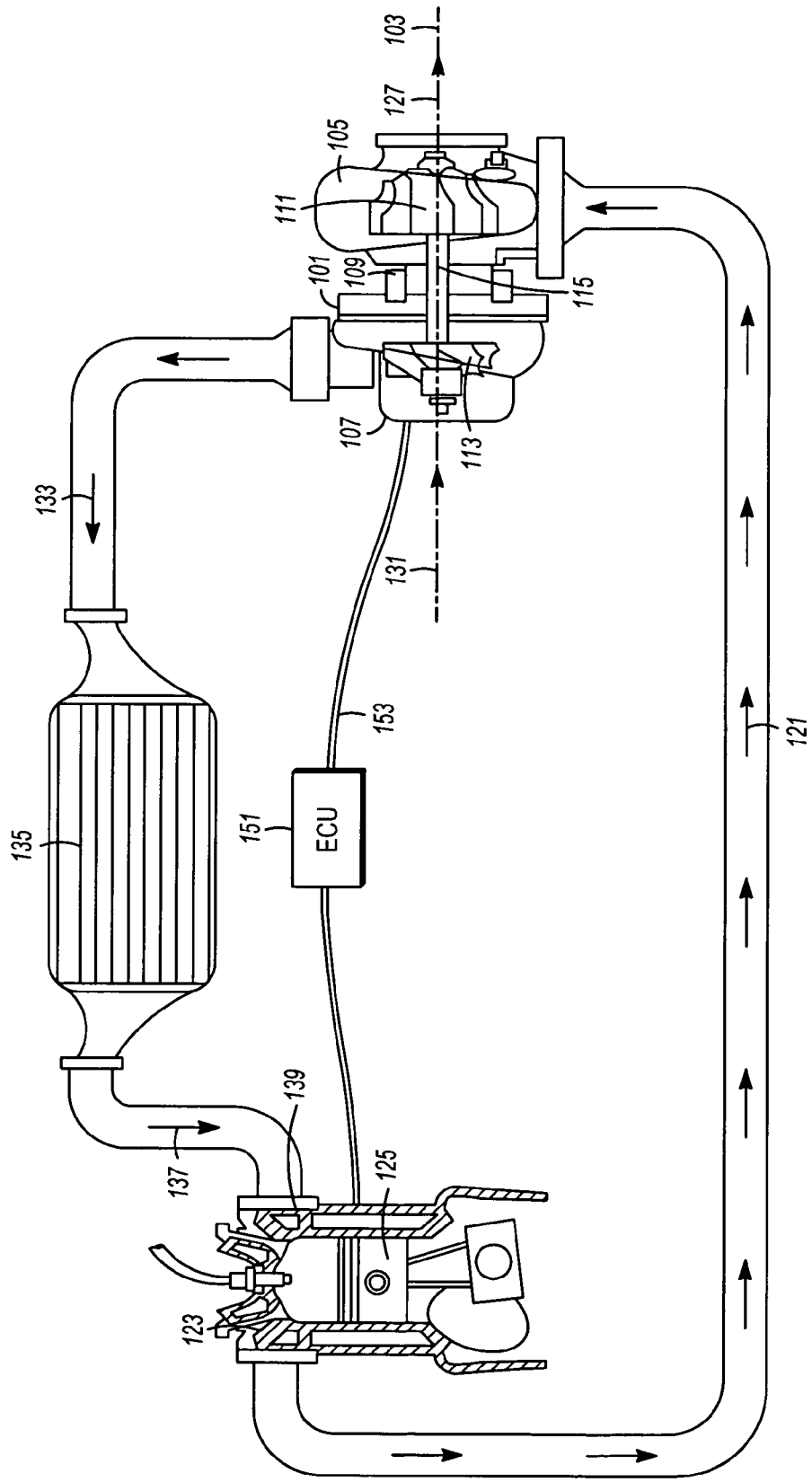
FIG. 1 is a schematic view of a turbocharged internal combustion engine embodying the invention.

With reference to FIG. 1, in a first embodiment of the invention a turbocharger 101 includes a turbocharger housing and a rotor configured to rotate within the turbocharger housing along an axis of rotor rotation 103 on thrust bearings and two sets of journal bearings (one for each respective rotor wheel), or alternatively, other similarly supportive bearings. The turbocharger housing includes a turbine housing 105, a compressor housing 107, and a bearing housing 109 (i.e., a center housing that contains the bearings) that connects the turbine housing to the compressor housing. The rotor includes a turbine wheel 111 located substantially within the turbine housing, a compressor wheel 113 located substantially within the compressor housing, and a shaft 115 extending along the axis of rotor rotation, through the bearing housing, to connect the turbine wheel to the compressor wheel.

The turbine housing 105 and turbine wheel 111 form a turbine configured to circumferentially receive a high-pressure and high-temperature exhaust gas stream 121 from an engine, e.g., from an exhaust manifold 123 of an internal combustion engine 125. The turbine wheel (and thus the rotor) is driven in rotation around the axis of rotor rotation 103 by the high-pressure and high-temperature exhaust gas stream, which becomes a lower-pressure and lower-temperature exhaust gas stream 127 and is axially released into an exhaust system (not shown).

The compressor housing 107 and compressor wheel 113 form a compressor stage. The compressor wheel, being driven in rotation by the exhaust-gas driven turbine wheel 111, is configured to compress axially received input air (e.g., ambient air 131, or already-pressurized air from a previous-stage in a multi-stage compressor) into a pressurized air stream 133 that is ejected circumferentially from the compressor. Due to the compression process, the pressurized air stream is characterized by an increased temperature, over that of the input air.

Optionally, the pressurized air stream may be channeled through a convectively cooled charge air cooler 135 configured to dissipate heat from the pressurized air stream, increasing its density. The resulting cooled and pressurized output air stream 137 is channeled into an intake manifold 139 on the internal combustion engine, or alternatively, into a subsequent-stage, in-series compressor. The operation of the system is controlled by an ECU 151 (engine control unit) that connects to the remainder of the system via communication connections 153.

Figure 2:
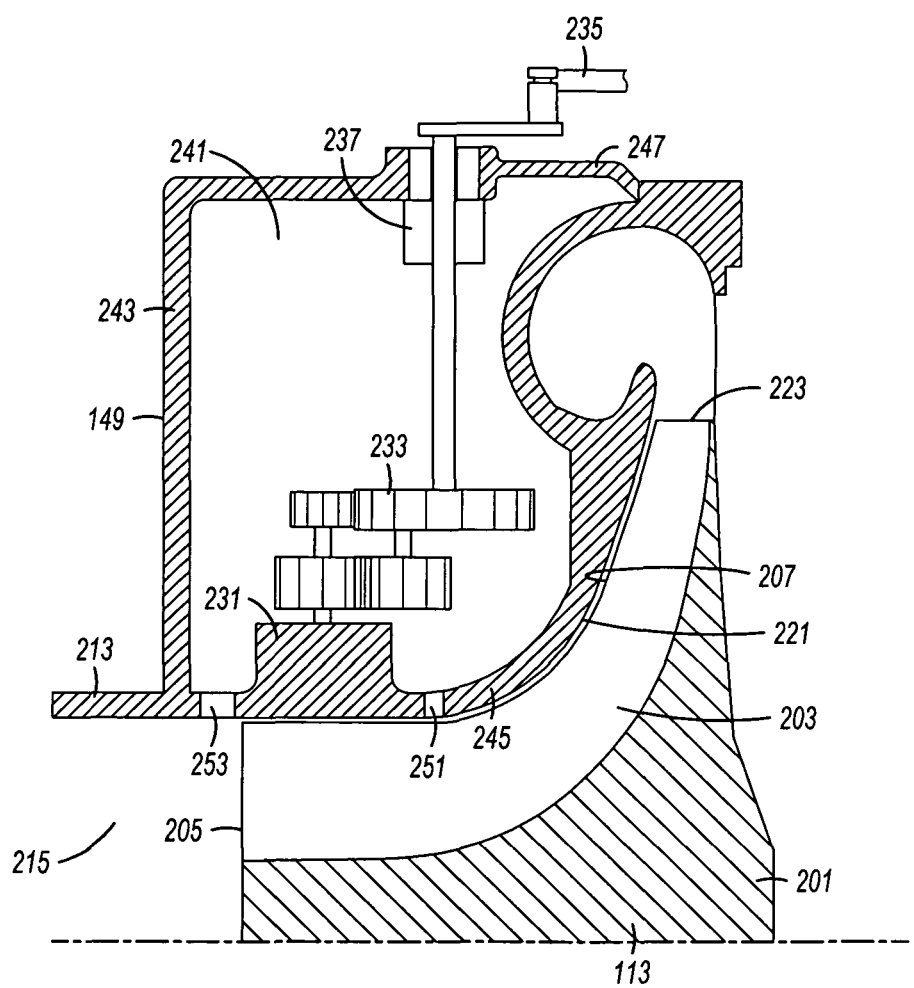
FIG. 2 is a front cross-sectional view of a portion of a compressor that is part of a turbocharger in the embodiment depicted in FIG. 1.

With reference to FIGS. 1 and 2, the compressor wheel 113 includes a hub 201 and a plurality of blades 203, each blade extending out from the hub and defining a leading edge 205, an outer edge 207 and a trailing edge 223. The blade leading edges, when spinning with the compressor wheel in rotation, establish a compressor inlet, while the trailing edges establish a compressor outlet.

The compressor housing 107 forms an inlet wall 213 that defines an inlet passageway 215 leading to the compressor inlet. The volume through which the blades spin is a blade passageway, and extends from the compressor inlet to the compressor outlet. The compressor housing also forms a shroud wall 221 closely conforming to the path that the blade outer edges 207 establish when the compressor wheel 113 spins in rotation, and thereby defines the boundary walls of the blade passageway. The shroud wall extends exactly the length of the blade passageway.

Figure 3:
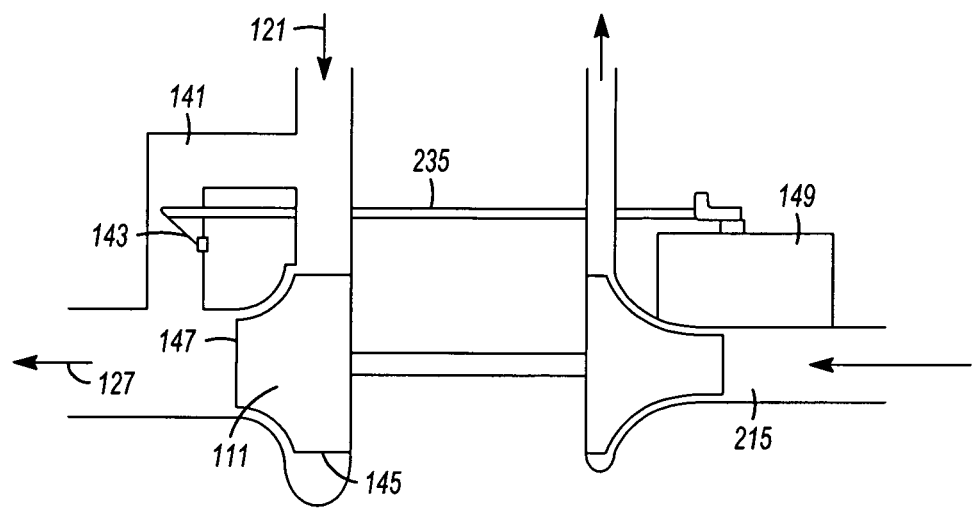
FIG. 3 is a schematic view of the turbocharger in the embodiment depicted in FIG. 1.

The turbocharger is configured to operate over an envelope of operating conditions, which thereby defines an envelope of operating conditions over which the compressor is configured to operate. With reference to FIGS. 1 to 3, through the envelope of turbocharger operating conditions, there are operating conditions in which it is desirable to decrease the amount of mechanical power generated by the turbine. During these conditions, the efficient operation of the turbocharger is augmented by a wastegate, i.e., a controlled passageway 141 diverting exhaust gas so that it bypasses the turbine wheel 111. The controlled passageway extends from the high-pressure and high-temperature exhaust gas stream 121 (upstream of an annular turbine wheel inlet 145) to the lower-pressure and lower-temperature exhaust gas stream 127 (downstream from a turbine wheel outlet 147). As is well known, the wastegate includes a valve 143 that controls the amount of exhaust air allowed to pass through the wastegate and bypass the turbine wheel.

The wastegate also includes an actuation system 149 configured to control the operation of the valve 143. The actuation system may be controlled by a simple pressure sensing device sensing the compressed air pressure, but more typically will be controlled by a closed loop control system, which will generally be a software system incorporated into the ECU 151.

In this embodiment, the actuation system includes an actuation mechanism including a DC electric motor 231, a plurality of gears 233 and a position sensor 237. The DC electric motor 231 is configured to drive the plurality of gears 233 to control a rod 235 that in turn drives the operation of the valve 143. The position sensor 237 is configured to provide actuation position feedback to the control system. The control system may also receive information on the operational status of the engine and the turbocharger, allowing the control system to control the wastegate for maximum efficiency.

The electric motor and gears are contained within an actuator chamber 241 formed at least in part by an actuator housing 243. The actuator housing includes an actuator base 245 that is thermally integral with the compressor housing, and a removable cover 247 providing access to the actuator chamber for assembly and servicing. Because the actuator is structurally attached and in thermal communication with the inlet wall, the inlet wall conductively cools the actuator at a thermally significant level. The phrase "thermally significant level" in this application should be understood as indicating a level of cooling that substantially contributes to the level of cooling necessary to keeps the actuator fully operational throughout a planned envelope of turbocharger operating conditions. It should be noted that while the housing conductively cools the motor, the inlet air convectively cools the inlet wall.

To further provide cooling to the electric motor and other actuation system parts, the shroud wall 221 forms a first, high pressure, chamber inlet port 251 that places the blade passageway in direct fluid communication with the actuator chamber 241. Typically this first port is at a location closer to the compressor inlet than to the compressor outlet. More particularly, this first port is slightly downstream of the inlet, providing partially pressurized air (with respect to the total pressurization level achieved by the compressor) that does not have the level of compression heating developed through the entire pressurization process.

In addition to the first port 251, the inlet wall forms a second, low pressure, chamber outlet port 253 that places the inlet passageway 215 in direct fluid communication with the actuator chamber 241. The actuator chamber forms a cooling passageway from the first port to the second port. The pressure of the air at the first port (from the blade passageway) is higher than at the second port (from the inlet passageway). As a result, partially pressurized air is injected into the actuator chamber from the blade passageway, and then vented back into the inlet passageway.

Thus, the actuator is characterized by a configuration wherein the actuator chamber forms a cooling passageway serially connecting the first port to the second port. The cooling passageway passes through and extends over a thermally significant portion of the actuation mechanism (e.g., portions of the electric motor, the gears, the position sensor, and/or the like). The first and second ports are sized and located (both stream-wise and circumferentially) along the inlet and blade passageways to permit (i.e., drive) an effective amount of air through the actuator chamber and thereby convectively cool the actuator at a thermally significant level. Optionally, baffles may be used to direct the airflow through the actuator chamber such that all components that require convective cooling receive adequate convective cooling.

The first and second ports, and the thermal connection between the motor and the compressor housing, are configured to cool the motor and maintain it at a temperature low enough for it to operate at its full rated power (i.e., it is not de-rated) over the entire envelope of operating conditions for which the turbocharger is configured to operate. In alternative embodiments the cooling configuration might only be adequate to maintain such a temperature for a subset of the entire envelope of operating conditions (e.g., only for operating conditions in which the wastegate operation might be most critical).

Figure 4:
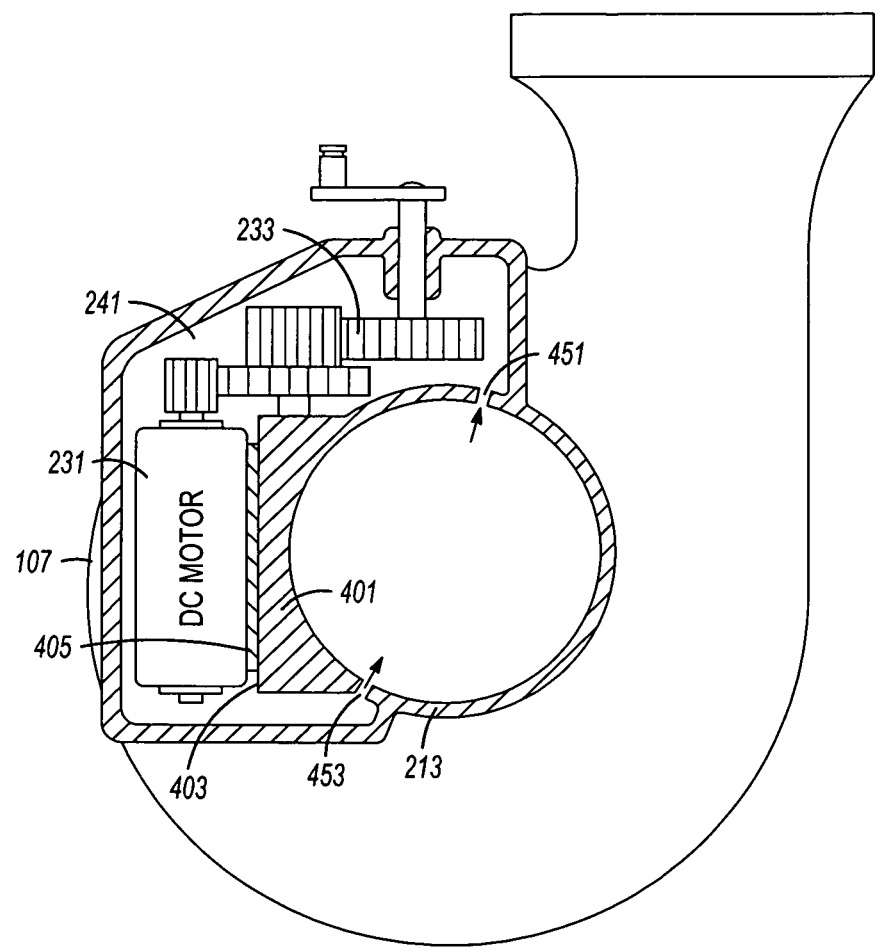
FIG. 4 is a left side cross-sectional view of a portion of a compressor in a second embodiment of the invention.

With reference to FIGS. 3 and 4, in a second embodiment of the invention, a substantially similar turbocharger is provided with a similar, but somewhat different wastegate actuation system configuration than is depicted in FIG. 2. An actuator base 401 is again in close thermal communication with the inlet wall 213 (which is part of the compressor housing), and may be integral with that inlet wall such that one side of that wall forms a portion of the inlet passageway 215, while an opposite side of that wall forms a motor-surface 403 of the actuator base. The electric motor 231 is attached and closely thermally coupled to the motor-surface by a thermocouple 405 composed of a compressible (i.e., mechanically resilient) and thermally conductive material. Thus, the electric motor is thermally coupled to a motor-surface of the compressor housing adjoining the inlet wall, and is conductively cooled by that wall at a thermally significant level.

Because the base 401 of the actuator housing is affixed to and/or integral with the compressor housing 107, the actuator may be subject to significant vibrations from the operation of the turbocharger. The electric mechanically resilient thermocouple may provide significant vibration damping between the motor and the motor-surface. This connection may provide for a reduction on mechanical loads on bearings of the electric motor 231 and gears 233, thereby increasing the reliability of the actuator.

Similar to the last embodiment, to provide additional cooling to the electric motor and other actuation system parts, the shroud wall forms a first, high pressure, chamber inlet port 451 that places the blade passageway in direct fluid communication with the actuator chamber 241. Typically this first port is at a location closer to the compressor inlet than to the compressor outlet. More particularly, this first port is typically slightly downstream of the inlet, providing partially pressurized air (with respect to the total pressurization level achieved by the compressor) that does not have the level of compression heating developed through the entire pressurization process.

In addition to the first port 451, the inlet wall forms a second, low pressure, chamber outlet port 453 that places the inlet passageway 215 in direct fluid communication with the actuator chamber 241. The actuator chamber forms a cooling passageway from the first port to the second port. The pressure of the air at the first port (from the blade passageway) is higher than at the second port (from the inlet passageway). As a result, partially pressurized air is injected into the actuator chamber from the blade passageway, and then that air is vented back into the inlet passageway.

In this embodiment, the actuator chamber 241 extends circumferentially around a thermally significant portion of the inlet passageway 215, and the first port 451 and second port 253 are circumferentially spaced such that the air driven through the actuator chamber must travel circumferentially through the actuator chamber to provide a thermally significant level of convective cooling to the actuator.

Thus, the actuator is characterized by a configuration wherein the actuator chamber forms a cooling passageway serially connecting the first port to the second port. The cooling passageway passes through and extends over a thermally significant portion of the actuation mechanism (e.g., portions of the electric motor, the gears, and/or the like). The first and second ports are sized and located (both stream-wise and circumferentially) along the inlet and blade passageways to permit (i.e., drive) an effective amount of air through the actuator chamber and thereby convectively cool the actuator at a thermally significant level. Optionally, baffles may be used to direct the airflow through the actuator chamber such that all components that require convective cooling receive adequate convective cooling.

Figure 5:
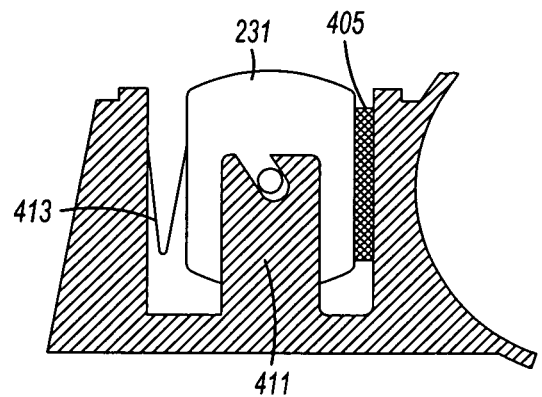
FIG. 5 is a bottom cross-sectional view of a portion of the compressor depicted in FIG. 4.

With reference to FIGS. 3-5, the electric motor 231 is held in tight thermal communication with the thermocouple 405 using mounting brackets 411 that allow limited movement of the motor with respect to the compressor housing 107, and a compression device 413 (e.g., a wedge spring) that compresses the motor against the thermocouple. This arrangement provides enough movement for the thermocouple to provide damped resilience that acoustically protects the motor, but not so much movement that the thermal communication between the motor and the housing is significantly hampered over the normal envelope of turbocharger operating conditions.

Figure 6:
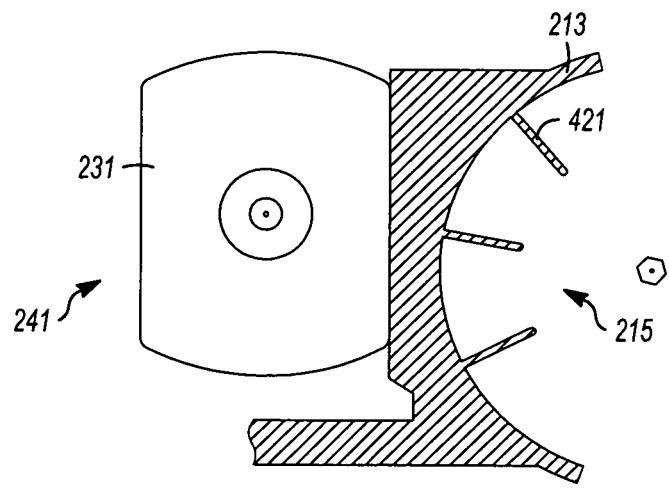
FIG. 6 is a top cross-sectional view of a portion of the compressor depicted in FIG. 4.

With reference to FIGS. 4 and 6, to further aid the conductive cooling provided to the motor 231 from being in close thermal communication with the inlet passageway 215, the inlet wall 213 of the compressor housing 107 may optionally form a plurality of flow directors 421 (e.g., flow straighteners) within the inlet passageway. These flow directors direct the flow of inlet air into the inlet at a consistent and optimized orientation (e.g., straight, or angled with respect to the blade rotation). At least some of these flow directors are located at a location thermally adjoining (e.g., directly on) the side of the inlet wall opposite from the motor-surface 403, and typically one or more are located on the inlet wall directly opposite the actuator chamber 241. This configuration provides close thermal communication between the flow directors and the electric motor and/or other actuator components, and further aids in the conductive cooling of the motor.

As a result of the electric actuator being in close communication with the inlet wall, and as a further result of the flow directors providing an increased thermal connection between the inlet wall and the flow of air through the inlet, the inlet air provides a significant level of cooling to the electric actuator, significantly reducing or eliminating the likelihood that the electric actuator will need to be de-rated by the ECU, or that the stator of the electric actuator will overheat.

It is to be understood that the invention comprises an actuator, a compressor, a turbocharger (and various sub-components), and a turbocharged internal combustion engine system, along with related apparatus and methods for designing and producing such components, along with the apparatus and methods themselves. Additionally, the various embodiments of the invention can incorporate various combinations of the above-described features with other systems typically incorporating such turbocharged systems. Alternative variations of these embodiments could comprise other types of compressor or turbine layouts (e.g., axial, mixed flow and dual flow). In short, the above disclosed features can be combined in a wide variety of configurations within the anticipated scope of the invention.

While particular forms of the invention have been illustrated and described, it will be apparent that various modifications can be made without departing from the spirit and scope of the invention. Thus, although the invention has been described in detail with reference only to the preferred embodiments, those having ordinary skill in the art will appreciate that various modifications can be made without departing from the scope of the invention. Accordingly, the invention is not intended to be limited by the above discussion, and is defined with reference to the following claims.

What is claimed is:

1. A compressor, comprising:
    a compressor housing;
    a compressor wheel rotatably mounted within the compressor housing, the wheel including a hub and a plurality of blades, each blade extending out from the hub and defining a leading edge and an outer edge, wherein the blade leading edges in rotation establish a compressor inlet; and
    an actuator including an actuator housing forming an actuator chamber, and an actuation mechanism;
    wherein the compressor housing forms an inlet wall defining an inlet passageway leading to the compressor inlet;
    wherein the compressor housing forms a shroud wall closely conforming to the blade outer edges;
    wherein the shroud wall forms a first port that is in direct fluid communication with the actuator chamber; and
    wherein the inlet wall forms a second port that is in direct fluid communication with the actuator chamber.

2. The compressor of claim 1, wherein the actuator forms a cooling passageway serially connecting the first port to the second port, the cooling passageway extending over a thermally significant portion of the actuation mechanism.

3. The compressor of claim 2, wherein the first and second ports are sized and located to permit an amount of air adequate to cool the actuator over a range of operating conditions covering the envelope of operating conditions over which the compressor is configured to operate.

4. The compressor of claim 2, wherein the actuator housing contains an electric motor, a gear and a position sensor, and wherein the thermally significant portion of the actuation mechanism includes one or more surfaces of at least one of the electric motor, the gear and the position sensor.

5. The compressor of claim 1, wherein the compressor housing is integral with a base of the actuator housing.

6. The compressor of claim 1, wherein the actuator housing contains an electric motor, wherein the electric motor is thermally coupled to a motor-surface of the compressor housing, and wherein the motor-surface of the compressor housing is on the inlet wall.

7. The compressor of claim 5, wherein the inlet wall forms a flow director within the inlet at a location thermally adjoining the motor-surface.

8. The compressor of claim 7, wherein the electric motor is thermally coupled to the motor-surface of the compressor housing a mechanically resilient thermocouple material providing significant vibration damping between the motor and the motor-surface.

9. The compressor of claim 5, wherein the electric motor is thermally coupled to the motor-surface of the compressor housing a mechanically resilient thermocouple material providing significant vibration damping between the motor and the motor-surface.

10. A turbocharger, comprising the compressor of claim 1, and a turbine, wherein the turbine includes a wastegate, and wherein the actuator actuates a valve of the wastegate.

11. A compressor, comprising:
    a compressor housing;
    a compressor wheel rotatably mounted within the compressor housing, the wheel including a hub and a plurality of blades, each blade extending out from the hub and defining a leading edge and an outer edge, wherein the blade leading edges in rotation establish an compressor inlet; and
    an actuator including an actuator housing forming an actuator chamber, and an actuation mechanism;
    wherein the compressor housing forms an inlet wall defining an inlet passageway leading to the compressor inlet; and
    wherein the actuator housing contains an electric motor, wherein the electric motor is thermally coupled to a motor-surface of the compressor housing, and wherein the motor-surface of the compressor housing is on the inlet wall.

12. The compressor of claim 11, wherein the inlet wall forms a flow director within the inlet at a location thermally adjoining the motor-surface.

13. The compressor of claim 12, wherein the electric motor is thermally coupled to the motor-surface of the compressor housing a mechanically resilient thermocouple material providing significant vibration damping between the motor and the motor-surface.

14. The compressor of claim 11, wherein the electric motor is thermally coupled to the motor-surface of the compressor housing a mechanically resilient thermocouple material providing significant vibration damping between the motor and the motor-surface.

15. A turbocharger, comprising the compressor of claim 11, and a turbine, wherein the turbine includes a wastegate, and wherein the actuator actuates a valve of the wastegate.

* * * * *